United States Patent
Smid et al.

(10) Patent No.: US 12,063,994 B2
(45) Date of Patent: Aug. 20, 2024

(54) LAMINATED GLOVE, DEVICE AND METHOD OF MAKING SAME

(71) Applicant: Wells Lamont Industry Group LLC, Skokie, IL (US)

(72) Inventors: Jason Smid, Chicago, IL (US); Kenneth LeVey, Chicago, IL (US); Caitlin Boyle, Chicago, IL (US)

(73) Assignee: Wells Lamont Industry Group LLC, Skokie, IL (US)

( * ) Notice: Subject to any disclaimer, the term of this patent is extended or adjusted under 35 U.S.C. 154(b) by 0 days.

(21) Appl. No.: 17/728,628

(22) Filed: Apr. 25, 2022

(65) Prior Publication Data

US 2022/0248783 A1    Aug. 11, 2022

Related U.S. Application Data

(62) Division of application No. 16/788,944, filed on Feb. 12, 2020, now Pat. No. 11,523,645.
(Continued)

(51) Int. Cl.
*A41D 19/00* (2006.01)
*A41D 19/015* (2006.01)
(Continued)

(52) U.S. Cl.
CPC ....... *A41D 19/0006* (2013.01); *A41D 19/001* (2013.01); *A41D 19/01505* (2013.01);
(Continued)

(58) Field of Classification Search
CPC ... A41D 19/0006; A41D 19/001; A41D 27/02
See application file for complete search history.

(56) References Cited

U.S. PATENT DOCUMENTS 3,283,338 A * 11/1966 Landau .............. A41D 19/0062
                                                    2/168
4,441,213 A *  4/1984 Trumble ............ A41D 19/0058
                                                    2/163
(Continued)

FOREIGN PATENT DOCUMENTS

KR          20100002956 U      3/2010

OTHER PUBLICATIONS

The International Search Report of the International Searching Authority, issued by ISA/EPO in connection with PCT/US2020/018112 dated May 29, 2020.
(Continued)

*Primary Examiner* — Tajash D Patel
*Assistant Examiner* — Tejash Patel
(74) *Attorney, Agent, or Firm* — Andrus Intellectual Property Law, LLP

(57) ABSTRACT

A layered, laminated glove includes an outer layer, a membrane formed from a liquid-resistant, air permeable material positioned on an inner surface of the outer layer and a liner formed from a moisture absorbing material. The liner is positioned on an inner surface of the membrane. The outer layer, membrane and liner are laminated to form a single glove. The glove includes a plurality of fingertip portions in which the outer layer, membrane and liner are substantially fully laminated throughout. The glove may include a 3D pattern formed in one or more layers of the laminate. The glove may include an enlarged knuckle section. A hand mold and system for making the gloves and a method are also disclosed.

19 Claims, 9 Drawing Sheets

Related U.S. Application Data

(60) Provisional application No. 62/863,689, filed on Jun. 19, 2019, provisional application No. 62/804,959, filed on Feb. 13, 2019.

(51) Int. Cl.
*A41D 27/02* (2006.01)
*B29D 99/00* (2010.01)
*B29L 31/48* (2006.01)

(52) U.S. Cl.
CPC ......... *A41D 27/02* (2013.01); *B29D 99/0067* (2013.01); *B29L 2031/4864* (2013.01)

(56) References Cited

U.S. PATENT DOCUMENTS

| | | | |
|---|---|---|---|
| 9,801,422 B2 * | 10/2017 | Anstey | A41D 19/0082 |
| 10,791,778 B2 * | 10/2020 | Williams | A41D 19/0062 |
| 2004/0025221 A1 | 2/2004 | Clark | |
| 2004/0098786 A1 | 5/2004 | Hottner et al. | |
| 2006/0117457 A1 | 6/2006 | Williams et al. | |
| 2009/0075019 A1 | 3/2009 | Loos | |
| 2012/0288628 A1 | 11/2012 | Nethsinghe et al. | |
| 2013/0139294 A1 | 6/2013 | Zetune et al. | |
| 2014/0026290 A1 | 1/2014 | Howland | |
| 2017/0135424 A1 | 5/2017 | Kim et al. | |
| 2018/0154622 A1 | 6/2018 | Howland | |
| 2019/0014835 A1 | 1/2019 | Hull | |
| 2019/0104784 A1 | 4/2019 | Hull et al. | |
| 2020/0253305 A1 | 8/2020 | Gapinski | |

OTHER PUBLICATIONS

The Written Opinion of the International Searching Authority, issued by ISA/EPO in connection with PCT/US2020/018112 dated May 29, 2020.

The International Preliminary Report on Patentability issued by WIPO in connection with PCT/US2020/018112 dated Aug. 17, 2021.

* cited by examiner

LAMINATED GLOVE, DEVICE AND METHOD OF MAKING SAME

CROSS-REFERENCE TO RELATED APPLICATION DATA

This application is a division of U.S. patent application Ser. No. 16/788,944, filed Feb. 12, 2020, titled LAMINATED GLOVE, DEVICE AND METHOD OF MAKING SAME, which claims the benefit of and priority to U.S. Provisional Patent Application Ser. No. 62/863,689, filed Jun. 19, 2019, titled LAMINATED GLOVE, DEVICE AND METHOD OF MAKING SAME, and U.S. Provisional Patent Application Ser. No. 62/804,959, filed Feb. 13, 2019, titled LAMINATED GLOVE, DEVICE AND METHOD OF MAKING SAME, the disclosures of which are incorporated herein in their entireties.

BACKGROUND

The present disclosure relates to gloves that are breathable and liquid-resistant or liquid-proof. More particularly, the present disclosure relates to laminated gloves that are breathable and liquid-resistant or liquid-proof provide, and further provide cut resistance and have high dexterity. A device for making the gloves and a method of making the gloves are also disclosed.

In many industries hand protection in the form of gloves is in constant use. Gloves are used, for example, in food processing, metals processing and fabrication, oil industries and more. Gloves provide a number of functions, including cut resistance, water resistance and absorption of, for example, perspiration. Often, multiple layers are needed to effect the desired function or functions. That is, workers are often required to wear one layer for cut resistance another layer for water resistance and yet another layer for absorption.

While the use of multiple layers often provides the desired level of protection and function, it has its drawbacks. For example, multiple layers increases the overall thickness of the hand protection as the layers are individual gloves. Increased thickness generally reduces dexterity. Increased thickness, especially from increased layers can also reduce the comfort of the glove.

Multiple layers in gloves also increases the likelihood that the layers will slip over each other when in use. This too reduces the ability for a user to manipulate items and further reduces dexterity and the ability of the user to properly carry out certain tasks.

Known methods for making layered or laminated gloves include stretching elastic textiles over molds (of, for example, hands), and heating the layers from the outside, in an oven, to bond the layers to one another. This method results in a thick laminate that does not provide the required "thinness", and thus the final product lacks the needed dexterity.

Other gloves and methods includes an outer layer of a known material, a nitrile inner layer and a latex adhesive. While these gloves and methods may produce a cut-resistant and water-resistant glove, such gloves are not breathable and as such the user's hand will sweat inside of the glove and the sweat cannot be dispersed because of the lack of breathability. Moreover, these gloves are generally less bulky but are not as thin as would otherwise be desired and as a result, can limit dexterity of the user.

Layered gloves are also known that are cut and sew gloves. That is, a membrane layer having tabs beyond fingers are sewn or otherwise adhered onto an outer layer (and in some gloves onto inner and outer layers). The drawbacks to these gloves are increased thickness, and layers that are not fully bonded to each other. These gloves are likewise, bulky and can be loose in that the layers slip amongst each other.

Additionally, glove manufacturers often include some indicia on an outer surface of a glove, such as a logo, brand, product name or customizable pattern. In known gloves, such indicia is provided as a coating on the outer surface and is applied, for example, by palm dipping or screen printing. However, in the food industry, indicia applied in such a manner may be exposed directly to food products can be transferred to the food products, for example by leaking or flaking. Thus, gloves used in the food industry often omit such indicia, which makes it difficult to brand or distinguish products from others in the market.

Further, it is desirable for gloves to promote dexterity and low-resistance to hand movement when worn by a user. A particular area where dexterity and low-resistance hand movements are desirable in a glove is at the knuckle section proximal to the base of the fingers. This area corresponds to the metacarpal-phalange joint on a user's hand. In some known gloves, resistance to movement arises when a user wearing the glove moves their hand from an open hand or open palm position to a power grip, or closed first position. The resistance results from the user having to stretch the glove material in the knuckle section during such movement and may negatively impact the user's comfort.

Efforts have been made to provide low-resistance movement in the knuckle section of gloves. For example, a known knit glove can be knit in the flat, open palm position and include a stretchy yarn that extends or retracts with a user's hand movements. A known cut-and-sew glove, such as a motorcycle glove, may be sewn so that the neutral position is the power grip position. A known dipped, knit glove may be knit in the flat, open palm position, stretched on a pre-curved hand form, and dipped in a polymer bath to lock fibers in a pre-curved configuration. However, additional or specialized manufacturing processes must be incorporated to the make the known gloves.

Accordingly, there is a need for hand protection in the form of a glove that is liquid-resistant or liquid-proof, breathable, cut resistant and form fitting. Desirably, such a glove has increased comfort and dexterity and includes layers that have a single layer feel. More desirably still, such a glove is thinner than other gloves providing similar liquid-resistant or liquid-proof, cut resistance and breathability.

In addition, there is a need for a glove suitable for use in the food industry which can include external indicia, such as logos, branding, product names, or other patterns. Further, it is desirable to provide a glove having increased space in the knuckle section to allow for low resistance movement of a user's hand within the glove when moving to a power grip position.

SUMMARY

In an aspect, a layered, laminated glove includes an outer layer, a membrane formed from a liquid-resistant, air permeable material positioned on an inner surface of the outer layer and a liner formed from a moisture absorbing material positioned on an inner surface of the membrane. The outer layer, membrane and liner are laminated to form a single glove. The glove includes a plurality of fingertip portions and the membrane and liner are substantially fully laminated throughout the fingertip regions. The fingertip portions can have a coating thereon. The fingertip portions of the glove can be formed having an enlarged region.

In an embodiment, the glove can include an enlarged knuckle section disposed between fingers and a back of the glove. The glove can include a 3D pattern formed in the outer layer. The 3D pattern can be an embossing. The 3D pattern can be raised or lowered relative to an adjacent portion of the outer layer. The 3D pattern can be, but is not limited to, a design, shape, logo, brand, product name, and the like.

In another aspect, a hand mold for making a layered, laminated glove includes a mold having a shape of a hand having fingers, a thumb, a palm opposingly facing a back of the hand and a wrist region. The mold can be formed from a thermally conductive material and have an open internal cavity.

In an embodiment, the mold has a heating/cooling system having a supply side and a discharge side. The heating/cooling system can include a series of open-ended fluid conveying channels in fluid communication with the cavity such that fluid is conveyed into the supply side and into the open internal cavity and is discharged from the hand mold through the discharge side.

In an embodiment, the supply side includes a supply manifold and the open-ended channels are in fluid communication with the manifold. The open-ended channels can extend into the fingers and thumb and the discharge can be at about the wrist region. The fluid drains from the fingers and thumb through the cavity and the discharge.

In an embodiment the hand mold fingertip regions of the fingers and thumb are enlarged regions. The enlarged regions can be, for example, rounded regions.

In an embodiment, the hand mold can include an enlarged knuckle box between a back hand section and a back finger section. The enlarged knuckle box may define a plane or curve different from a plane or curve defined by the back hand section, the back finger section, or both. The hand mold can include a pattern body projecting from, or recessed relative to an outer surface of the hand mold. The pattern body has a size and a shape. The pattern body can be formed integrally as one piece with the hand mold or attached to the hand mold. The hand mold can further include an external pattern block having a shape substantially corresponding to the shape of the pattern body, and a size configured to provide a clearance between a periphery of the shape of the pattern body and the shape of the pattern block. The shape of the pattern block can be defined by a cutout in the pattern block. The pattern block may fit over or around the pattern body.

In another aspect, a system for making a layered, laminated glove includes a hand mold having a shape of a hand having fingers, a thumb, a palm opposingly facing a back of the hand and a wrist region. In an embodiment, the mold is formed from a thermally conductive material and has an open internal cavity.

The system includes a heating/cooling system having a supply side and a discharge side, and a series of open-ended fluid conveying channels in fluid communication with the cavity. The fluid is conveyed into the supply side and into the open internal cavity and is discharged from the hand mold through the discharge side.

The system further includes a fluid supply for supply a heating and/or a cooling fluid and a fluid discharge for receiving fluid discharged from the hand mold. In embodiments, the system includes a vacuum bag for positioning over a glove on the hand mold and a vacuum supply for drawing a vacuum in the bag positioned over the layers forming the glove. In embodiments, the hand mold supply side includes a supply manifold and the open-ended channels are in fluid communication with the manifold. The open-ended channels can extend into the fingers and thumb and the discharge can be at about the wrist region.

In an embodiment, the hand mold can include an enlarged knuckle box between a back hand section and a back finger section. The hand mold can further include a pattern body projecting from, or recessed relative to an outer surface of the hand mold, the pattern body having a size and a shape. The hand mold can further include an external pattern block having a shape substantially corresponding to the shape of the pattern body, and a size configured to provide a clearance between a periphery of the shape of the pattern body and the shape of the pattern block.

In still another aspect, a method for making a layered, laminated glove includes the steps of positioning an outer layer, a membrane and a liner, each having a profile of a hand, on a hand mold, heating the hand mold from an interior of the hand mold, with the outer layer, membrane and liner positioned thereon for a predetermined period of time and drawing a vacuum around an outside of the outer layer to form a laminate of the outer layer, membrane and liner to form the layered, laminated glove.

The method can include, after heating the hand mold for the predetermined period of time, cooling the hand mold from an interior of the hand mold. Methods can include forming enlarged regions at fingertips of the gloves. In such methods, fingertip regions of the hand mold have enlarged regions. In methods, the vacuum is drawn about coincidentally with heating of the hand mold.

In an embodiment, the method can include forming an enlarged knuckle box between a back hand section and a back finger section of the hand mold. In an embodiment, the method can include forming a pattern body projecting from, or recessed relative to an outer surface of the hand mold, the pattern body having a size and a shape. In an embodiment, the method can include positioning an external pattern block at an outer surface of the outer layer aligned with the pattern body. The external pattern block has a shape substantially corresponding to the shape of the pattern body, and a size configured to provide a clearance between a periphery of the shape of the pattern body and the shape of the pattern block. The material layers can extend through the clearance.

These and other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

FIGS. 5A and 5B illustrate a prototype hand mold in which FIG. 5A is an external view as seen from the back side of the hand mold and FIG. 5B is an internal view of the hand mold as seen from the back side of the hand mold;

DETAILED DESCRIPTION

Figure 1:
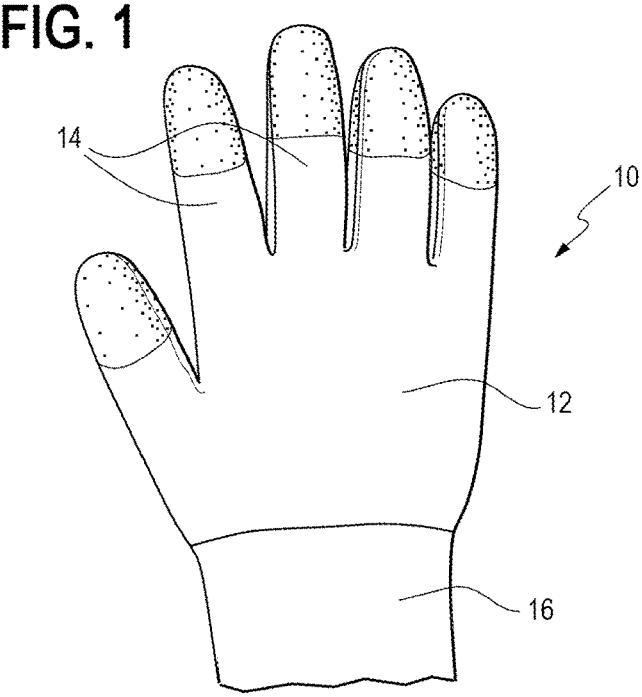
FIG. 1 is an illustration of an embodiment of a layered breathable, liquid-resistant or liquid-proof, cut resistant glove having high dexterity.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

FIG. 1 illustrates an embodiment of a layered, laminated, cut resistant, breathable glove 10. The glove 10 can include a palm (not shown), a back 12, fingers including a thumb 14 and a cuff 16, such as the illustrated elasticized portion. The glove 10 can include a drawstring (not shown) to tighten the glove 10 around the user's wrist. Other conventional glove 10 accessories can be included. For purposes of this disclosure, reference to fingers 14 includes the thumb.

Figure 2:
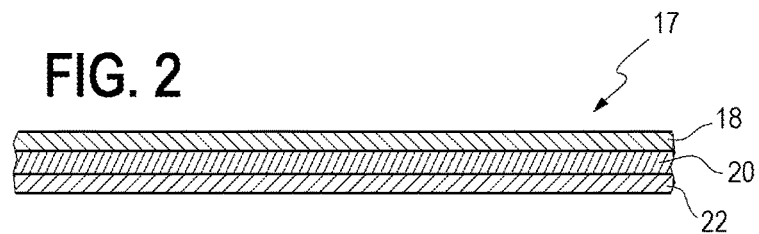
FIG. 2 is a cross-sectional illustration of a material that can be used to form the glove.
Figure 3:
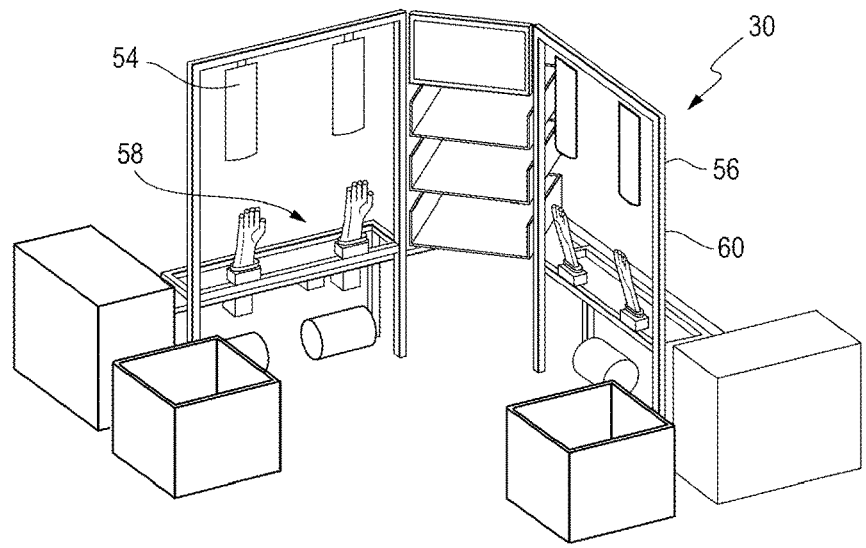
FIG. 3 is an illustration of a system for making the glove.

An example of a cross-section through the laminate 17 that forms the glove 10, illustrating exemplary layers of the glove 10 is shown in FIG. 2. The layers can include an outer, cut-resistant layer 18, a membrane 20 and a liner 22. The membrane 20 can be positioned between the outer layer 18 and the liner 22.

The liner 22 can provide for absorbing moisture (perspiration) from the user's hand or moisture that enters into the inside of the glove 10. The liner 22 may also provide some thermal insulating and or cut resistant properties. In embodiments, the liner 22 may be, for example, a hydrophilic material, such as a hydrophilic polyurethane. Other liners 22 can be formed from polyethylene, nylon and the like. Some embodiments of liners 22 provide a wicking effect, drawing moisture away from the user's hand. Such a liner 22 can transport the moisture from the user's hand to an outer surface of the liner 22 where the moisture can evaporate.

The membrane 20 can be, for example a water or liquid proof (or resistant) layer. The membrane 20 can be a water or liquid proof (or resistant) member that is water vapor permeable and is breathable—that is permeable to air. Examples of membranes 20 include layered polyolefin films, microporous polytetrafluoroethylene (PTFE) and the like. Other suitable membrane 20 materials can be formed from polyethylene sulfone, expanded polytetrafluoroethylene (ePTFE), polyurethane, such as a hydrophilic polyurethane, para aramid, polyester, and the like.

The outer layer 18 is knit from, for example, a cut resistant material. In an embodiment, the outer layer 18 material is a knit of polyethylene, metal wire (such as stainless steel), spandex and nylon. Other materials for the outer layer 18 include fiberglass, ultrahigh molecular weight polyethylene (UHMWPE) and the like.

The outer layer 18 may also include hydrophobic or oleophobic properties by, for example, being knit with, in part, hydrophobic or oleophobic fibers to increase the liquid permeability resistance of the glove 10.

Figure 6:
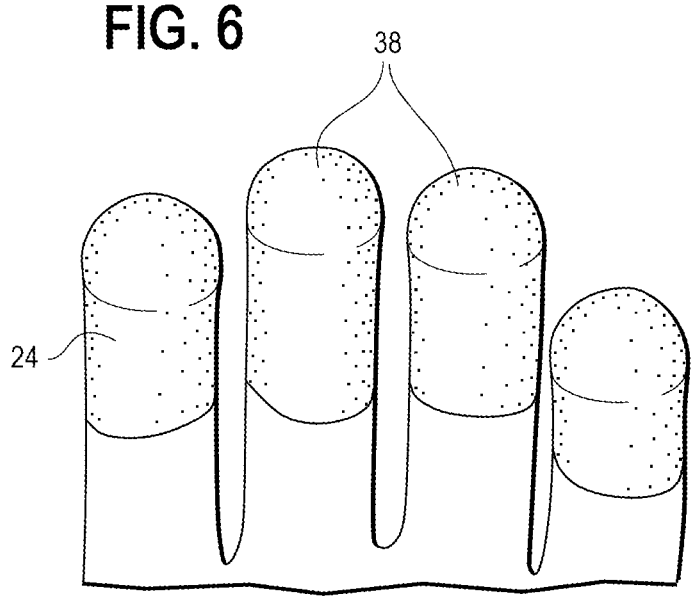
FIG. 6 is an illustration of the fingertips of a formed glove on the hand mold.
Figure 7:
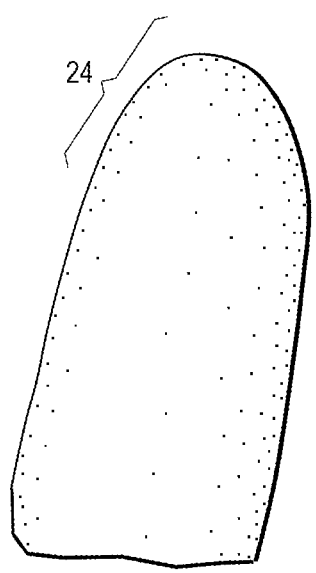
FIG. 7 is an illustration of a fingertip of the glove after the glove has been removed from the hand mold.

In an embodiment, the glove fingertips 24 are slightly enlarged by, for example and as will be described in more detail below, forming the glove 10 on a mold 26 having enlarged fingertips as illustrated at 28 in FIGS. 4A-4C. Again, for purposes of the present disclosure, reference to fingertips 24 of the glove 10 and fingertips 28 of the mold 26 includes the tips of the thumb of the glove 10 and the mold 26. The hand mold fingertips 28 are enlarged to promote even stretching of the glove fingertips 24 to enhance dexterity and feel. In this way, the user's fingers have sufficient room to move and maneuver, and are not so constricted as to reduce comfort. The expanded fingertips 24 are not, however, so great as to form oversized pockets that do not conform to the user's fingers and fingertips. That is, bulk is not increased at the fingertips 24 which would otherwise reduce a user's ability to grasp and handle materials. As illustrated in FIGS. 6 and 7, the fingertips 24 can be coated to increase the user's ability to grasp and hold materials.

As will be appreciated from a study of the figures, the glove 10 has the imprint of a hand mold design, including the curvature and placement of the thumb and fingers, width of the hand and wrist, and other features known in the industry, such as in the palm-dip segment.

Figure 4A:
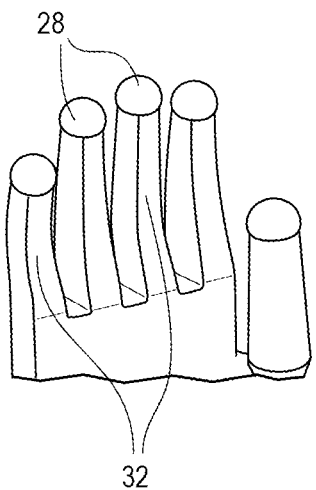
FIGS. 4A-4C are illustrations of a hand mold for making the glove.
Figure 4B:
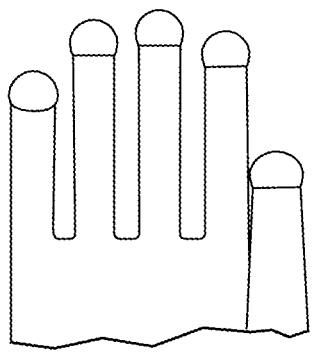
Figure 4C:
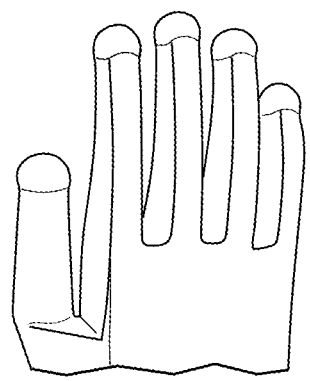

A system 30 for making the gloves 10 is illustrated in FIGS. 3, 4A-4C and 5A and 5B and includes the hand mold 26. Referring to FIGS. 4A-4C, the mold 26 includes an outer form of a hand, including the hand palm/back, fingers including the thumb 32 and wrist 34. The mold 26 is formed in the shape of a hand, including the natural placement and curvatures of the thumb and fingers 32 and the thinning toward the wrist 34.

The hand mold fingertips 28 include enlarged regions as indicated at 36. In the illustrated embodiment, the enlarged regions 36 are formed as balls at the end of the fingers. FIG. 6 illustrates the fingertip portion 24 of the glove 10 positioned on mold 26, the fingertips 24 having a coating 38 thereon. Such a coating 38 can be used to increase the user's ability to grasp and hold materials. As noted above, the slightly enlarged hand mold fingertips 28 promote even stretching of the glove fingertips 24 to enhance dexterity and feel in the finished glove 10. Shapes other than balls can be used. For example, the mold fingertips 28 can be ovoid in shape, rounded arrow-head shaped and the like. Those skilled in the art will appreciate the other forms and shapes that can be used to form the enlarged glove fingertips 24. FIG. 7 shows a finished glove fingertip 24 having a slightly enlarged profile.

Figure 5A:
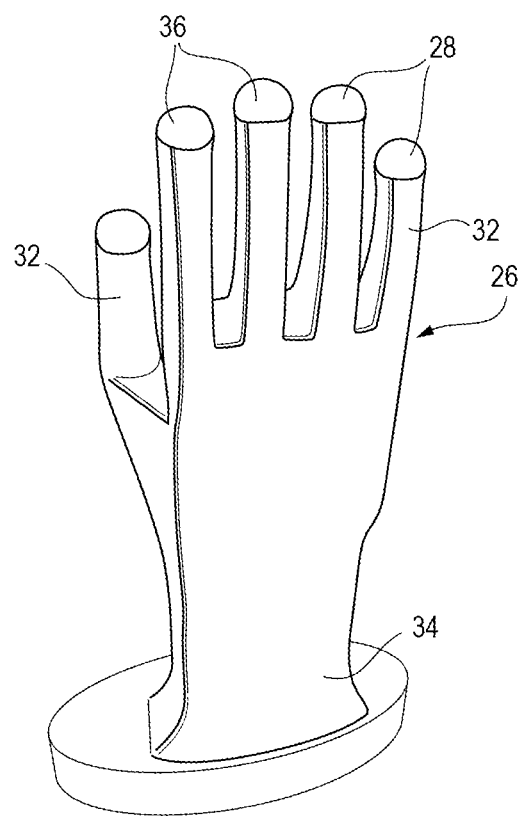
Figure 5B:
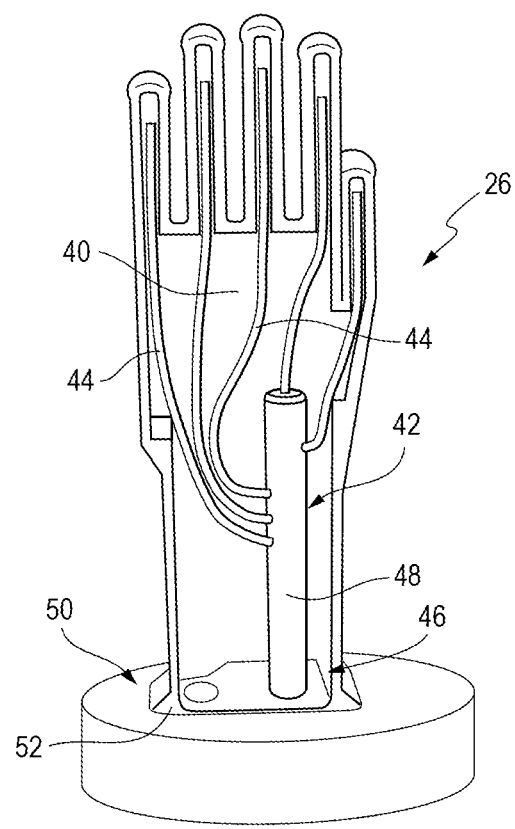

As seen in FIG. 5B, the hand mold 26 has an open interior or cavity 40 and includes a heating/cooling system 42. In an embodiment, the heating/cooling system 42 is configured to heat and/or cool the glove 10, as positioned on the mold 26, from the inside of the glove 10 or the inside of the mold 26. To accomplish the internal heating and/or cooling, the heating/cooling system 42 includes a series of heating/cooling channels 44 through which a fluid can be introduced to the interior 40 of the mold 26 to heat and/or cool the glove 10 from the inside of the glove 10. In an embodiment, the heating/cooling system 42 includes a supply side 46 having a manifold 48 that extends into the mold 26 at about the palm and back of the hand. The channels 44 extend from the manifold 48 into the fingers and thumb 32. The channels 44 are open-ended. As such, the fluid is conveyed through the manifold 48 and channels 44 and into the mold open interior 40. A discharge side 50 of the mold 26, for example a discharge at the base 52 of the mold 26 allows for discharge of the fluid from the mold 26. In this manner, fluid flows into the manifold 48, into the channels 44 and open interior 40 of the mold 26 and out through the discharge 50. The mold 26 can be formed from a material that allows for efficient heat transfer, such as aluminum, stainless steel and the like, so that energy from the fluid is transferred into the mold 26 and the glove 10.

It has been found that a hand mold 26 that is shaped in such a way to stretch the textiles (the glove material layers, e.g., the outer layer 18, membrane 20 and liner 22) to achieve a final glove 10 product and in such a way that it bonds without folds in the materials and results in a glove 10 with an exceptional fit. The mold 26 can be oversized, for example, between 5 percent and 75 percent of the original knit size, depending on the location and desired final feel of the glove 10. The final laminated glove 10 will, in part, take the shape of the mold 26 since some of the fibers may be bonded together with an adhesive.

The hand mold 26 which includes a system 42 that allows heating/cooling from inside of the glove 10, enhances the ability to bond the layers 18, 20, 22 because in typical lamination processes the outside of the glove 10 is covered in an insulating vacuum bag 54 during the heat/cool process. As such the system 30 includes a vacuum supply, as indicated generally at 56 in FIG. 3, to supply a vacuum to the bag 54, to draw the layers 18, 20, 22 onto each other. In the present system the internal heating promotes bonding from inside of the glove 10. The hand mold enlarged fingertip regions 28, which are illustrated as balls on the tips of the fingers 32 promote even stretching of the glove fingertips 24 for good dexterity and feel, and reduced bulk at the fingertips 24.

During known processes of forming multi-layer bonded knit gloves it is difficult to get the fingertips of the layers to intimately join. The lack of proper bonding, delamination, and/or bulk at the fingertips reduces dexterity and decreases appeal of the glove 10 product. The present mold 26 design promotes the material (the layers 18, 20, 22) at the fingertips 24 pulling together to improve product feel and appearance and to promote improved use of the gloves 10.

Referring again to FIG. 3, in an embodiment, the heating/cooling system 42 includes valves, pumps, heaters, and chillers (illustrated generally at 58 in FIG. 3) to cycle the temperature of the hand mold 26 above and below specified temperatures in a consistent, repeatable time. The system 42 can be configured to operate in a manual mode, a programmed automatic mode (through, for example a controller 60) or a hybrid, semiautomatic mode. The system 42 includes the molds 26 as well as provisions to position the vacuum bags 54, as noted above, over the gloves 10 during the molding cycle.

The heating/cooling system 42 allows bonding of multiple layers (e.g., layers 18, 20, 22) of textile gloves 10 in a compressed state (via the vacuum bags 54) and in addition further allows for a controlled temperature profile internally of the mold 26 and glove 10 to facilitate bonding of the layers 18, 20, 22. It will be understood that although the layers disclosed and discussed herein, namely the outer layer 18, membrane 20 and liner 22 are examples of a glove 10 construction and that other glove constructions can be made using the present systems 30, 42 and method and that such other glove constructions are within the scope and spirit of the present disclosure.

It will also be appreciated that the heating/cooling system 42 heats and/or cools a custom designed hand mold 26 from the inside of the mold 26 and glove 10 to specified hot and cold temperatures to activate and reflow adhesive. Additionally, the system 30 for making the glove 10 compresses and intimately holds together the textile layers 18, 20, 22 using a vacuum supply 56 and vacuum bag 54 during the heating and/or cooling cycles. The combination of compression of the textile layers 18, 20, 22 and internal heating and/or cooling of the glove 10 during bonding achieves consistent bond strengths and forms a thin glove 10 that, depending upon the layers chosen, provides hand protection in the form of a glove 10, that is liquid-resistant or liquid-proof, breathable, cut resistant and form fitting. Such a glove 10 has increased comfort and dexterity and includes layers that have a single layer feel, do not slip relative to each other, and is thinner than other gloves 10 providing similar qualities or characteristics.

Figure 8A:
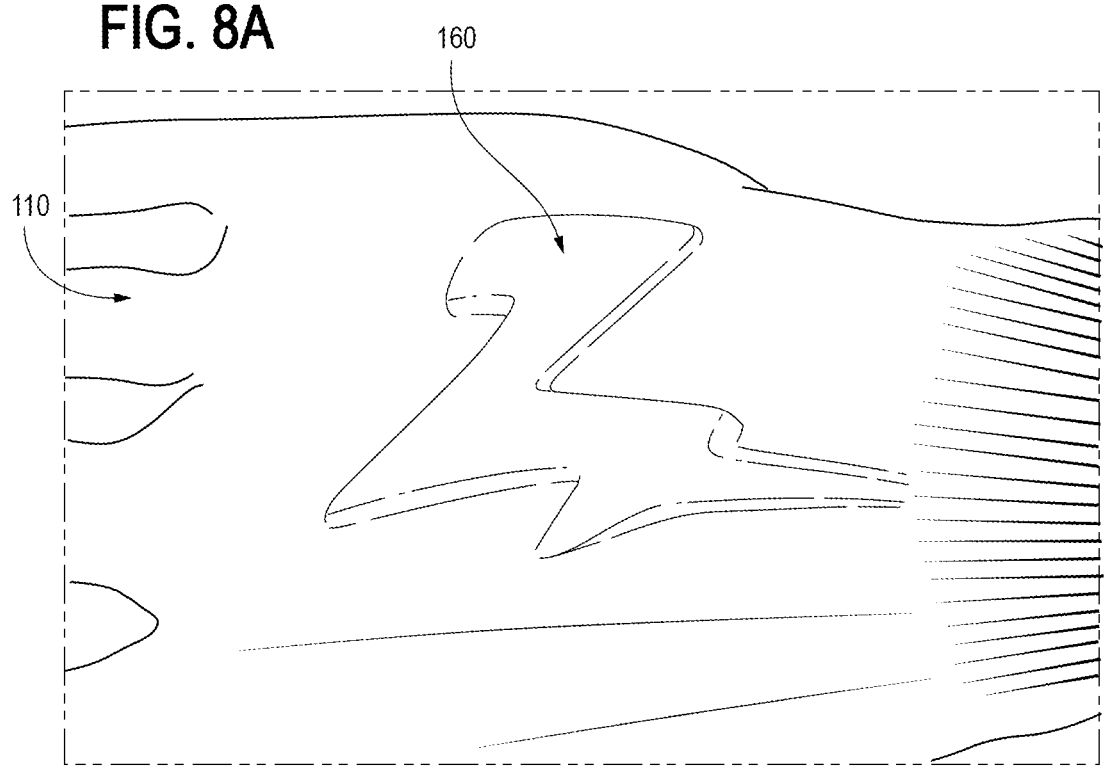
FIGS. 8A and 8B are plan views of a glove having a 3D pattern according to an embodiment.
Figure 8B:
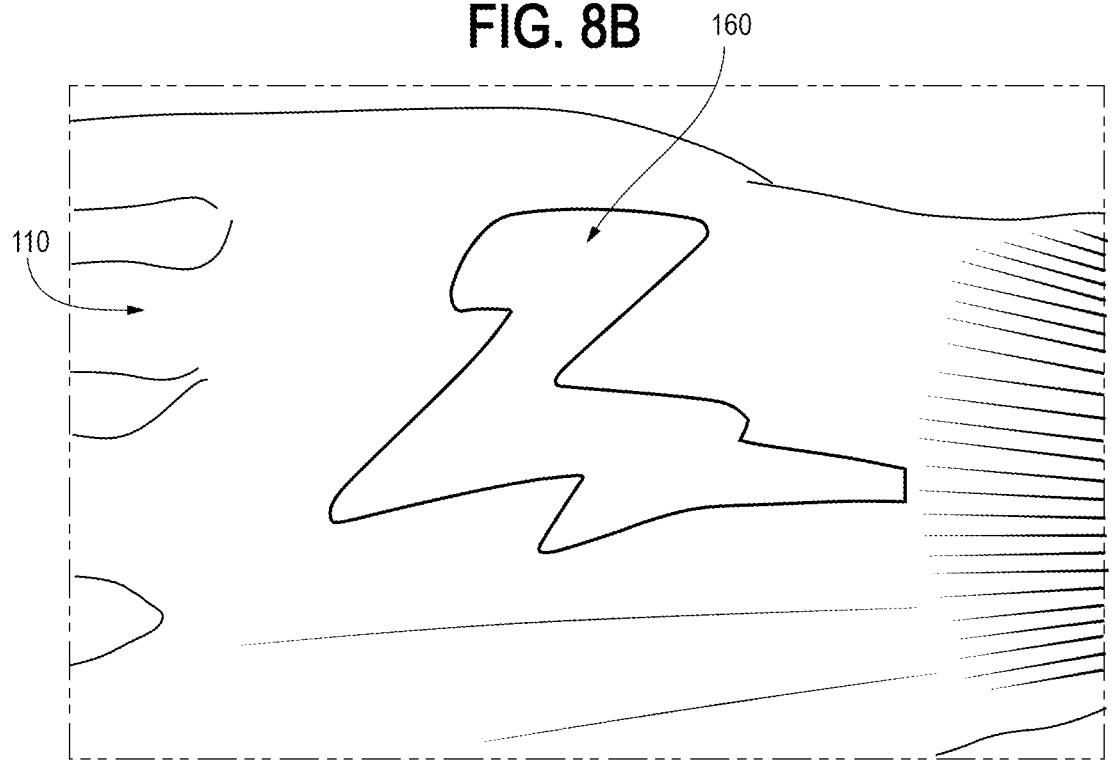
Figure 9:
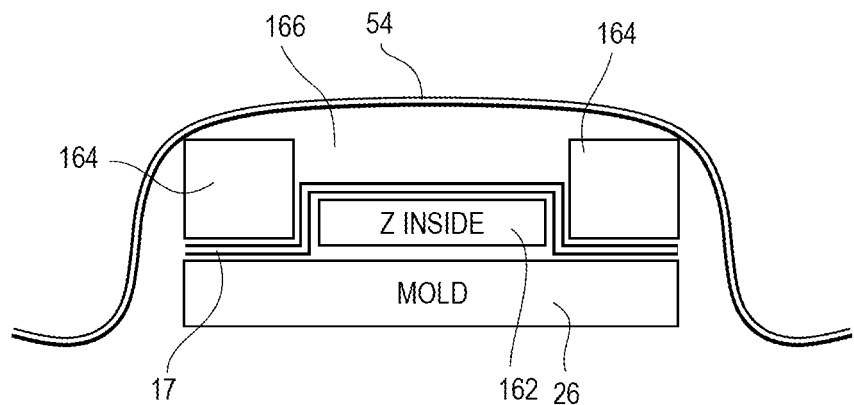
FIG. 9 is a diagram showing a laminate, hand mold and vacuum bag in a system for making a glove, according to an embodiment.
Figure 10:
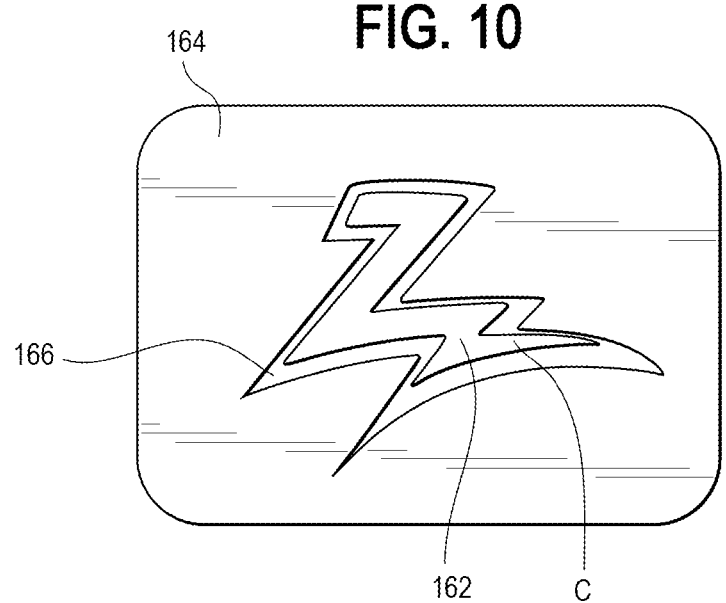
FIG. 10 is a plan view of a pattern body and pattern block according to an embodiment.

FIGS. 8-10 show aspects of a glove 110 and the hand mold 26 for use the system 30 for making the glove 110, according to an embodiment. In the following description, the glove 110 and the mold 26 are the same or substantially the same as those described above with reference to FIGS. 1-7, unless indicated otherwise, for example, by way of description of additional or different features. Thus, further description of the features described in the embodiments above may be omitted below.

With reference to FIG. 8A, in one embodiment, the glove 110 may be formed having a three-dimensional (3D) pattern 160 presented as a raised or lowered portion of an outer surface of the cut-resistant layer 18 of the laminate 17. The 3D pattern may be any desired pattern, logo, design, brand, product name, or other indicia. In one embodiment, the 3D pattern may be an embossing, i.e., a raised or lowered pattern formed as an embossed section of one or more layers of the laminate 17. FIG. 8B is the same as FIG. 8A, but includes an outline around the 3D pattern 160 for clarity of reference. It will be appreciated that the glove 110 does not necessarily include the outline around the 3D pattern 160.

In one embodiment, the 3D pattern 160 may be formed on a back 12 of the glove 110. However, it is envisioned that the 3D pattern 160 can be formed on any other portion of the glove 110, or a combination of different glove portions. Alternatively, or in addition, more than one 3D pattern 160 may be formed on the glove 110. In one embodiment, the layers 18, 20, 22 are laminated substantially throughout the 3D pattern 160.

Accordingly, the glove 110 may be formed having a 3D pattern 160 on an outer surface of the glove 110 without applying additional material, such as ink, paint, adhesives, stickers, patches, stitching and the like on the outer surface of the outer cut-resistant layer 18. By avoiding application or coating of such additional material on the outer surface of the cut-resistant layer, a potential source of debris, such as leakage or flaking, is avoided.

FIGS. 9 and 10 show additional components of, or for use with, the hand mold 26 to form the 3D pattern 160 of the glove 110. For example, in one embodiment, the mold 26 may include a pattern body 162 substantially in the size and shape of the desired 3D pattern 160. In one embodiment, the pattern body 162 is a projection disposed on or formed integrally as one piece with the hand mold 26. The pattern body 162 is positioned on the hand mold 26 at a location corresponding to a location on the glove 110 where the 3D pattern 160 is desired.

The mold 26 further includes a pattern block 164 including the desired size and shape of the 3D pattern 160. In one embodiment, the desired size and shape of the 3D pattern is formed as a cutout 166 in the pattern block 164. The cutout 166 has substantially the same shape as the pattern body 162 and is sized to provide a clearance 'C' around an outer periphery of the pattern body 162.

In a method making the glove 110 with the system 30, the laminate 17 is fitted over the hand mold 26 with the pattern body 162 disposed against an inner surface of the laminate (i.e., an inner surface of the liner 22). The pattern block 164 is positioned against the outer surface of the laminate 17 (i.e., the outer surface of the cut-resistant layer 18) with the cutout 166 substantially aligned with and surrounding the pattern body 162. The laminate 17 extends in the clearance 'C' between the outer periphery of the pattern body 162 and an inner periphery of the cutout 166. In one embodiment, the clearance 'C' may be approximately 0.10 inches. The present disclosure is not limited to such a clearance however, and it will be appreciated that the clearance maybe increased, decreased and/or may vary along the outer periphery of the pattern body 162 and the inner periphery of pattern block 164 which defines the shape of the cutout 166, in any desired manner.

In one embodiment, adhesive, such as a hotmelt adhesive is applied at intermittent locations of the membrane 20 to accommodate bonding of the layers 18, 20, 22 when the hand mold is heated as described in the embodiments above. The laminate 17 and mold 26 together with the pattern body 162 and pattern block 164 positioned as described above, are placed in the vacuum bag 54 to force the laminate layers 18, 20, 22 over the pattern body 162 into the desired 3D pattern 160 on the glove 110, and reflow the adhesive to lock fibers of the cut resistant layer 18 in place. When the glove 110 is demolded, the area of the laminate, and in particular of the cut-resistant layer 18, is raised or lowered with sharp reveal in the desired 3D pattern 160. Thus, the glove 110 is produced having the desired 3D pattern formed in one or more layers of the glove 110. In other embodiments, the glove 110 having the desired 3D pattern 160 may be formed by using a press to apply pressure at heat to the laminate, instead of the vacuum.

Figure 11:
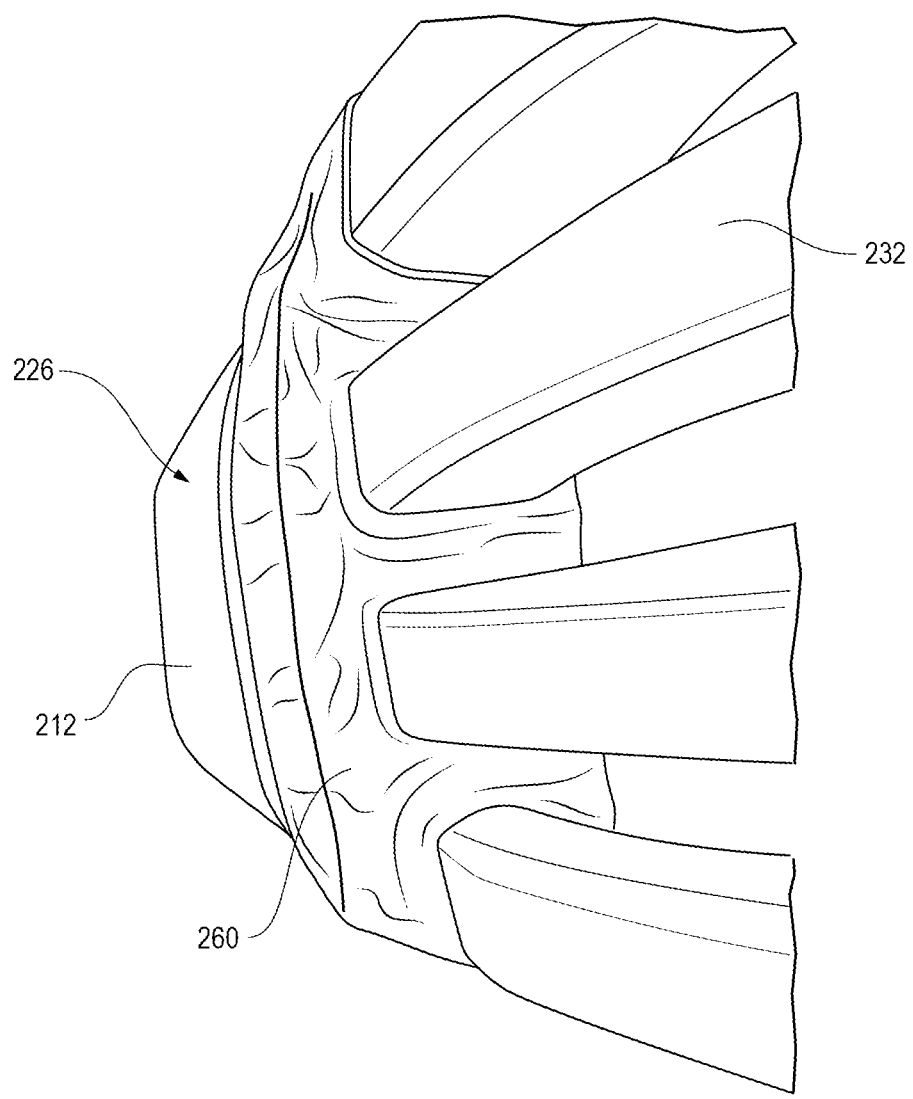
FIG. 11 is a top view of a hand mold having an enlarged knuckle box according to an embodiment.
Figure 12:
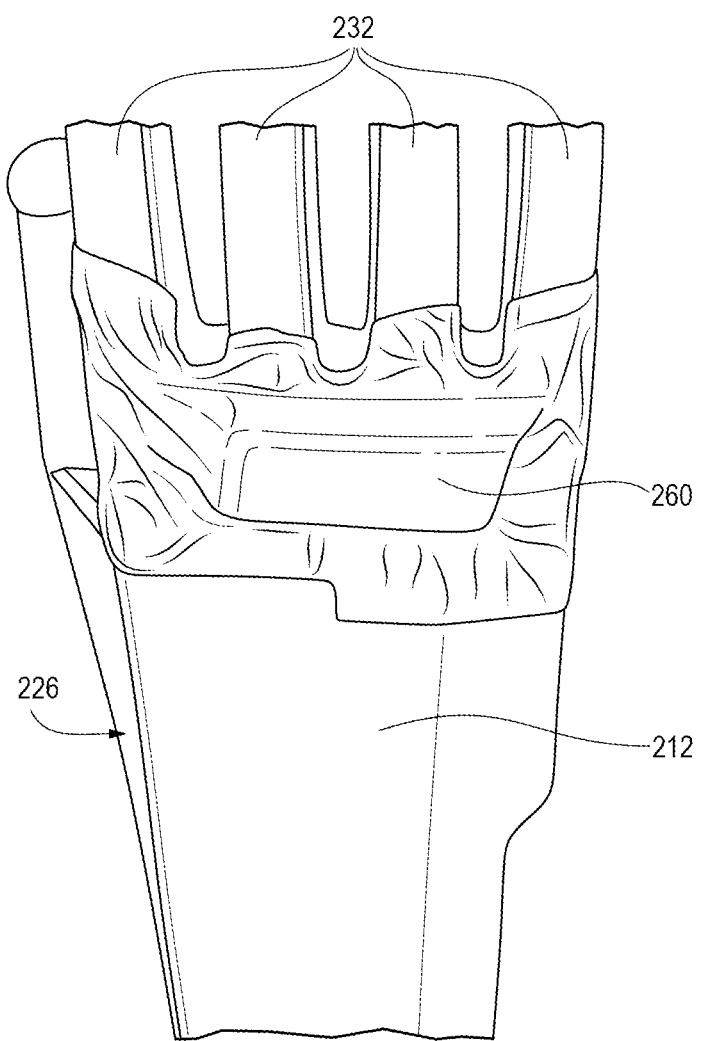
FIG. 12 is a rear view of the hand mold of FIG. 11, according to an embodiment.

FIGS. 11 and 12 show views of a hand mold 226 for forming a glove having an enlarged knuckle region at the base of the fingers, according to an embodiment. In the following description, the mold 226 is the same or substantially the same as the mold 26 described above with reference to FIGS. 1-7, unless indicated otherwise, for example, by way of description of additional or different features. Thus, further description of the features described in the embodiments above may be omitted below.

In one embodiment, the hand mold 226 includes a back hand section 212 and a back finger section 232 at areas generally corresponding to the back 12 of a glove and the back of glove fingers 32. In one embodiment, the back hand section 212 has an outer surface which may generally define a plane or a curve. Similarly, the back finger section 232 has an outer surface (for example, on each finger) that may generally define a plane or a curve. In one embodiment, the surface of the back finger section 232 is substantially tangential to tangential to the surface of the back hand section 212.

The hand mold 226 further includes an enlarged knuckle box 260 between the back hand section 212 and back finger section 232 at a location corresponding to a knuckle region of the glove formed with the mold 226. In one embodiment, the enlarged knuckle box 260 projects outwardly relative to a plane or curve defined by the back hand section 212 and/or the back finger section 232. The enlarged knuckle box 260 may be integrally as a one piece, continuous construction with the hand mold 226, or in another embodiment, may be attached to the hand mold 226 using a known, suitable fastener or fasteners.

Figure 13:
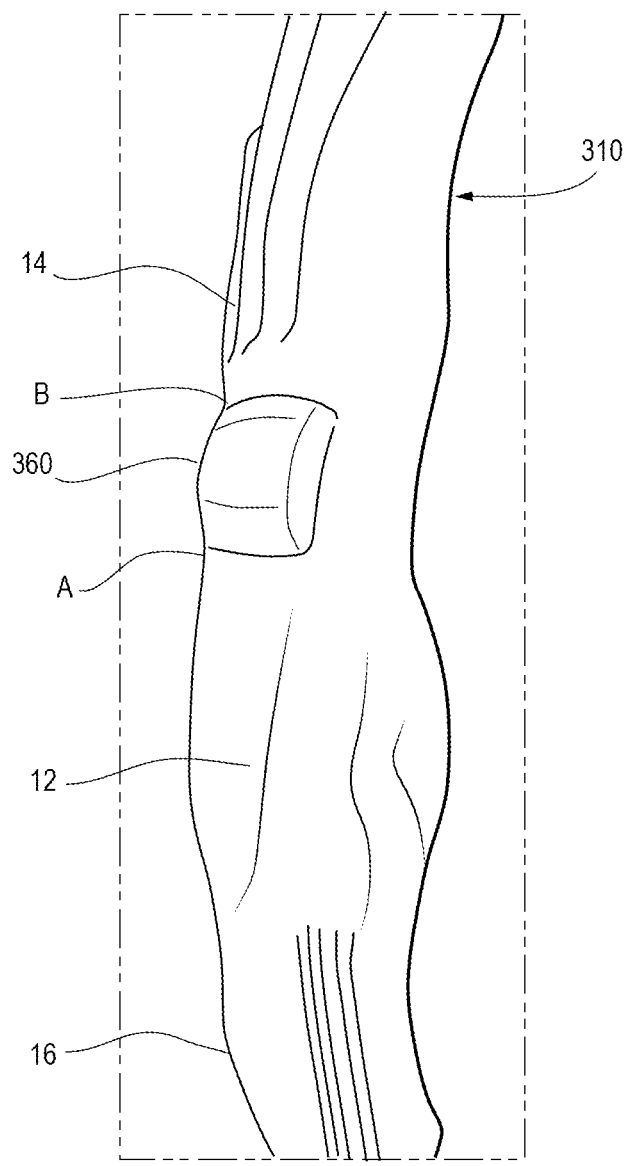
FIG. 13 is a side view of a glove according to another embodiment.
Figure 14:
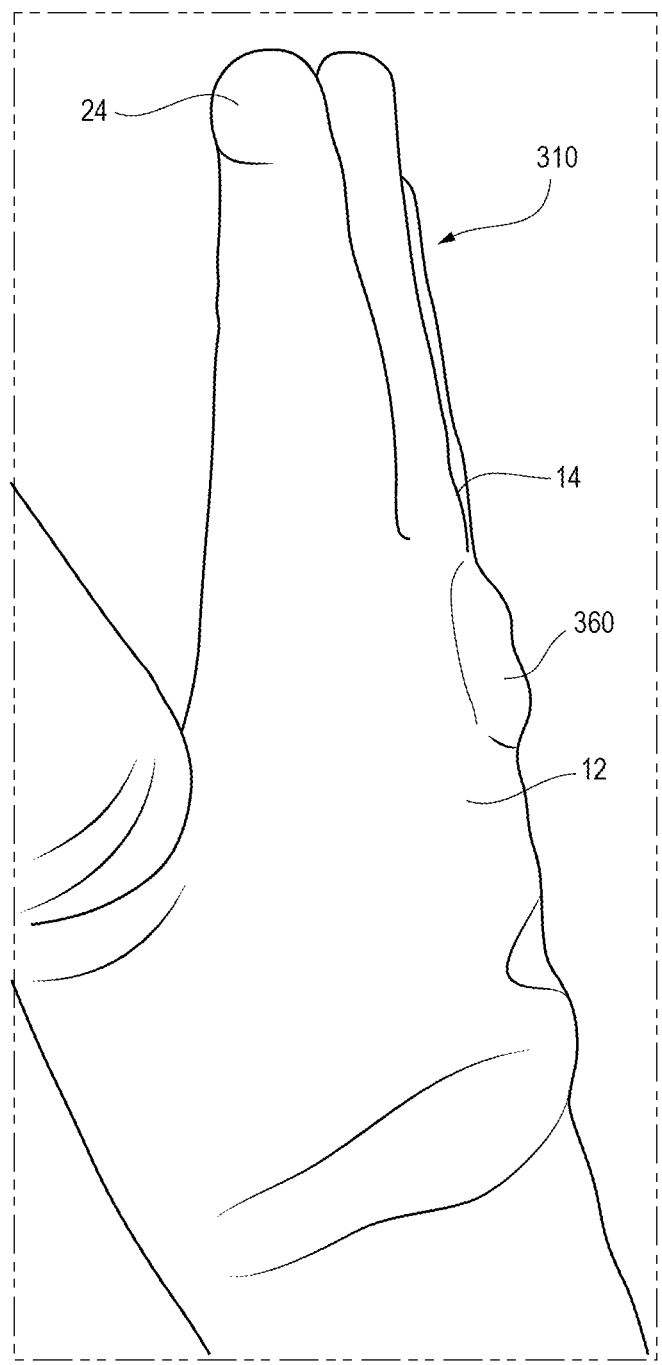
FIG. 14 is a perspective view of the glove of FIG. 13.

Referring to FIGS. 13 and 14, a glove 310 may be formed by in the system 30 described above by fitting the laminate 17 over the mold 226 having the enlarged knuckle box 260. The material of the laminate 17, i.e., the layers 18, 20, 22, is stretched over the enlarged knuckle box 260. Upon heating of the hand mold 226, the adhesive is activated and reflows to bond the material layers 18, 20, 22 together in the region of the enlarged knuckle box 260 to form the enlarged knuckle section 360 of the glove 310. The enlarged knuckle section 360 of the glove 310 is in the region of the user's metacarpal-phalange joint when wearing a properly fitted glove formed in manner described above.

Accordingly, in the glove 310 formed having the enlarged knuckle section 360, stretching of the knuckle section during hand movement from an open-hand configuration to a power grip (closed fist) configuration may be limited or substantially avoided, thereby reducing or limiting resistance experienced by a user of the glove when making a closed fist. For example, in one embodiment, the enlarged knuckle section 360 may have a peripheral length on an outer surface extending from a first point 'A' adjacent to a back 12 of the glove 310 and a second point 'B' adjacent to a proximal end of a finger 14, generally in a direction from a wrist cuff 16 to a fingertip 24. The peripheral length may be the same in the open-hand configuration of the glove 310 and the power grip configuration of the glove 310. In one embodiment, the layers 18, 20, 22 are laminated substantially throughout the enlarged knuckle section 360.

Accordingly, with the enlarged knuckle section 360 formed in the laminated glove 310, extra space is provided for knuckles of the wearer. In use, for example while gripping a knife or other tool, the extra space around the knuckles is provided in the power grip configuration, which is the configuration the wearer's hand will likely be in the majority of the time. Thus, the enlarged knuckle section 360 of the laminated glove 310 may provide increased comfort compared to prior laminated gloves. For example, the enlarged knuckle section 360 is configured to provide adequate space around a wearer's knuckles so that the glove material does not, or only minimally stretches over the wearer's knuckles, and a force applied over the wearer's knuckles by a stretched material may substantially be avoided. In addition, the enlarged knuckle section 360 may improve dexterity compared to previous laminated gloves.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure. One or more features from an embodiment above may be combined with or replace features of any of the other embodiments described above.

It will also be appreciated by those skilled in the art that any relative directional terms such as sides, upper, lower, top, bottom, rearward, forward and the like are for explanatory purposes only and are not intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

The invention claimed is:

1. A hand mold for a layered, laminated glove, the hand mold comprising:
 a mold having a shape of a hand having fingers, a thumb, a palm opposingly facing a back of the hand and a wrist region, the mold being formed from a thermally conductive material and having an open internal cavity; and
 a heating/cooling system having a supply side and a discharge side, and a series of open-ended fluid conveying channels in fluid communication with the open internal cavity, wherein fluid is conveyed into the supply side and into the open internal cavity and is discharged from the hand mold through the discharge side;
 wherein the open internal cavity is fluid-tight at fingertip regions of the fingers and thumb of the mold.

2. The hand mold of claim 1, further comprising an enlarged knuckle box between a back hand section and a back finger section.

3. The hand mold of claim 2, wherein the enlarged knuckle box defines a plane or curve different from a plane or curve defined by the back hand section, the back finger section, or both.

4. The hand mold of claim 1, further comprising a pattern body projecting from, or recessed relative to an outer surface of the hand mold, the pattern body having a size and a shape.

5. The hand mold of claim 4, wherein the pattern body is formed integrally as one piece with the hand mold.

6. The hand mold of claim 4, wherein the pattern body is attached to the hand mold.

7. A hand mold for a layered, laminated glove, the hand mold comprising:
 a mold having a shape of a hand having fingers, a thumb, a palm opposingly facing a back of the hand and a wrist region, the mold being formed from a thermally conductive material and having an open internal cavity;
 a heating/cooling system having a supply side and a discharge side, and a series of open-ended fluid conveying channels in fluid communication with the open internal cavity, wherein fluid is conveyed into the supply side and into the open internal cavity and is discharged from the hand mold through the discharge side;
 a pattern body projecting from, or recessed relative to an outer surface of the hand mold, the pattern body having a size and a shape; and
 an external pattern block having a shape substantially corresponding to the shape of the pattern body, and a size configured to provide a clearance between a periphery of the shape of the pattern body and the shape of the pattern block.

8. The hand mold of claim 7, wherein the shape of the pattern block is defined by a cutout in the pattern block.

9. The hand mold of claim 7, wherein the pattern block is configured to fit over or around the pattern body.

10. The hand mold of claim 1, wherein the supply side includes a supply manifold and the open-ended channels are in fluid communication with the manifold.

11. The hand mold of claim 10, wherein the open-ended channels extend into the fingers and thumb.

12. The hand mold of claim 1, wherein the discharge side is at about the wrist region.

13. The hand mold of claim 12, wherein the fluid drains from the fingers and thumb through the open internal cavity and the discharge side.

14. The hand mold of claim 1, wherein the fingertip regions of the fingers and thumb are enlarged regions.

15. The hand mold of claim 14, wherein the enlarged regions are rounded regions.

16. A hand mold for a layered, laminated glove, the hand mold comprising:
 a unitary mold having a shape of a hand having fingers, a thumb, a palm opposingly facing a back of the hand and a wrist region, the mold being formed from a thermally conductive material and having an open internal cavity; and
 a heating/cooling system having a supply side and a discharge side, and a series of open-ended fluid conveying channels in fluid communication with the open internal cavity, wherein fluid is conveyed into the supply side, through the series of open-ended fluid-conveying channels, and into the open internal cavity, and subsequently is discharged from the hand mold through the discharge side.

17. The hand mold of claim 16, wherein the open internal cavity is fluid-tight at fingertip regions of the fingers and thumb of the mold.

18. The hand mold of claim 16, wherein the open internal cavity extends into each of the fingers and thumb of the mold, including into fingertip regions of each of the fingers and thumb of the mold.

19. The hand mold of claim 16, wherein the fluid drains from the fingers and thumb through the open internal cavity and the discharge side.

* * * * *